May 12, 1964
W. J. KINDERMAN
3,132,516
LIQUID LEVEL INDICATOR
Filed April 3, 1962
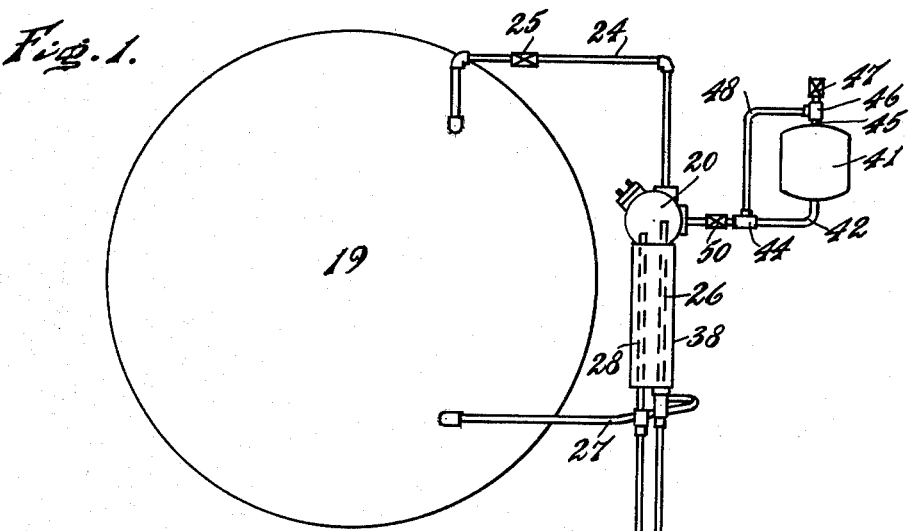
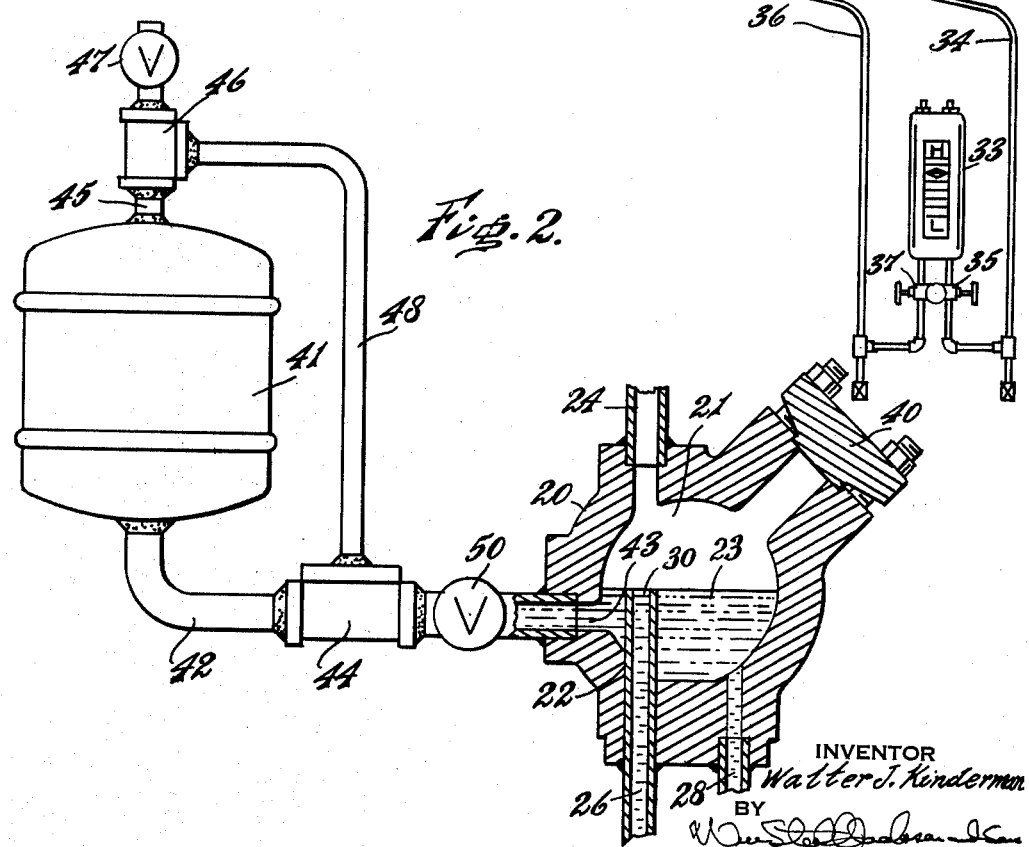
INVENTOR
Walter J. Kinderman
BY
ATTORNEYS United States Patent Office 3,132,516
Patented May 12, 1964

3,132,516
LIQUID LEVEL INDICATOR
Walter J. Kinderman, Philadelphia, Pa., assignor to Yarnall-Waring Company, Philadelphia, Pa., a corporation of Pennsylvania
Filed Apr. 3, 1962, Ser. No. 184,744
4 Claims. (Cl. 73—299)

The present invention relates to liquid level indicators of the character used to indicate the liquid level in a boiler or the like.

A purpose of the invention is to eliminate the danger of damage to a boiler by inaccurate readings of liquid level due to sudden fluctuation in boiler pressure.

A further purpose is to make the liquid level indicator function effectively even when a liquid level gauge is obscured by boiling, surging or foaming.

A further purpose is to provide a sealed water container protected against loss by evaporation from an open surface which can replenish the constant heat chamber in case of sudden fluctuation when the boiler is in service or in the case of loss by evaporation when the boiler is not in service.

A further purpose is to provide proper functioning of the constant head chamber when condensation is not adequate to permit constant overflow.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a diagrammatic front elevation showing a liquid level indicator system embodying the invention.

FIGURE 2 is an enlarged fragment of FIGURE 1 viewed from the opposite side and partly in central vertical section.

Describing in illustration but not in limitation and referring to the drawings:

Many boilers utilize, in addition to a liquid level gauge of the visible type having a gauge glass, a liquid level indicator. In the case of a liquid level indicator, liquid level such as water level in a boiler is measured by the difference in height between a constant overflow liquid column established above the highest level to be indicated and a variable head of the water level to be indicated.

The constant head column is continuously filled to overflowing by condensation of steam or other vapor, and the differential head is accurately transmitted to the indicator regardless of the magnitude of the pressure in the boiler and without regard to the ambient condensations.

Some liquid level indicator systems also thermally compensate for the density of the liquid with temperature and pressure variation by surrounding all or part of the constant head column from the indication range by a vapor jacket in communication with the boiler or by some other suitable heat transfer means. Thus, the liquid in the constant head column can be maintained at temperatures up to saturation.

It should be emphasized that in the case of boiler water indication, it is extremely important that the true level be indicated at all times. If the water level in the boiler should drop to such an extent as to expose boiler tubes to heat combustion gases without contained water to control the temperature, the boiler tubes will become overheated and may fail by burning out or blowing out, causing shutdown of the boiler and expensive repairs. Accuracy of the water level indication, therefore, is of the utmost importance.

There have been cases where boilers exposed to sudden pressure drops, either by failure of a boiler tube or by excessive steam demands, have lost part or all of the constant head liquid column through boiling off of the water with pressure reduction and simultaneous lowering of the saturation temperature. This has caused the boiler water level indicator to render a false high reading and the operator, thus misinformed, has curtailed water additions, with the result that the boiler has been destroyed.

I have discovered that such disasters can be prevented. By providing an auxiliary head stabilizing chamber which is above the level of the constant head overflow chamber and connecting it to the constant head chamber beneath the level of the water therein so as to provide a water seal, any evaporation caused by a sudden pressure drop can be completely compensated for by relatively cold water and the constant head can be maintained regardless of the rapidity of pressure drop in the system.

I illustrate in the drawings a constant head chamber 20 which has an interior constant head space 21 which is filled with water 22 up to the level 23.

The constant head space is connected to the steam space of the boiler 19 by connection 24 suitably provided with normally open valve 25.

The constant head chamber is provided with variable head column 26 which extends down through connection 27 to a low point on the water space in the boiler 19 and the level 30 serves as an overflow to maintain the constant head in the space 21.

The constant head chamber also has a constant head column 28.

The opposite sides of a pressure differential indicator 33 connect respectively by a pressure connection 36 through normally open valve 37 to variable head column 26 of the constant head chamber, and by connection 34 and normally open valve 35 to constant head connection 28 of the constant head chamber.

The differential pressure indicator 33 is suitably of the character shown in my United States Patent No. 2,509,644.

In order to correct for temperature, a suitable heat transfer arrangement 38 as well known in the art is provided between the variable head column 26 and the constant head column 28.

Access to the constant head chamber 20 for inspection and cleaning is provided by a removable base plate 40. This feature is optional and is in no sense essential to the operation of the system.

At a position above the level 30 of the constant head column 28 and suitably exposed to the atmosphere so that it will be at a temperature much below that of the constant head chamber 20, there is provided an auxiliary head chamber 41, suitably a tank adequate to stand the boiler pressure and having a bottom connection 42 which extends into the constant head chamber at a point 43 which is beneath the level 30 of the constant head so as to provide a water seal.

In order that the relatively cold reservoir can equalize when it fills, a T 44 is provided in the bottom connection 42. A connection 45 is also provided at the top of the auxiliary head chamber 41 and this connects to a T 46. The T 46 connects at the top with a normally closed valve 47 which may be used to prime the system but otherwise remains closed.

The T's 44 and 46 are connected by an equalizer connection 48. On high pressure boiler applications the T-fitting 46 and the valve 47 may be omitted, in which case the tube 48 may be joined directly to the auxiliary head chamber at 45.

In operation of the device, in case there is a rapid pressure drop in the boiler, water from the auxiliary head chamber flows into the constant head chamber to maintain the constant head during the fluctuation. As water from the auxiliary head chamber flows into the constant head chamber, steam takes the place of the water in the auxiliary head chamber.

As pressure in the system is restored, the steam in the auxiliary head chamber which has displaced the water drained from the auxiliary head chamber 41 condenses since the auxiliary head chamber is relatively cold, at a temperature close to ambient, possibly of the order of 100 or 200 degrees F. The condensation of the steam in the auxiliary head chamber 41 permits water to be drawn back into the auxiliary head chamber until the auxiliary head chamber becomes completely recharged with water and ready to function in another cycle to replenish the constant head chamber 20.

The volume of the auxiliary head chamber 41 is adequate to supply any reasonable reserve of water, but suitably will be at least twice that of the volume occupied by water in the constant head chamber 20 and in many cases three times the water volume of the constant head chamber 20. This is suitable for a system where the mean temperature of the constant head chamber is below saturation.

It is not likely that two successive cycles of pressure drop will occur before the auxiliary head chamber 41 has time to recharge, but in a system where this is likely to occur, the volume of the auxiliary head chamber 41 can be enlarged accordingly.

The auxiliary head chamber by providing constant head stabilization provides a number of advantages.

Most important, it removes all possibility that damage to the boiler may occur by inaccurate water level readings due to sudden lowering of the boiler pressure and loss of the liquid in the constant head chamber. Thus, it safeguards against damage to valuable boiler equipment and ensures continuity of service by providing accurate liquid level indication.

It should be noted that the invention provides for retention of accuracy by the indicator even where a gauge glass cannot be accurately read because of boiling, surging or foaming in the gauge glass.

The device of the invention also stabilizes accuracy in systems where more than one indicator is connected to a single constant head chamber and where the resulting displacement could introduce an error until condensation replenished the constant head level which was caused by the displacement.

The invention provides a supply of pressurized water which is free from any interface relation with steam and saturation temperatures, permitting it to cool to a lower temperature which on replacement of the flashed water is capable of extracting the super heat from the parts with respect to the lowered saturation temperature corresponding to the lower pressure.

The device of the invention also serves as a sealed water container which protects against loss by evaporation from an open surface such as a constant head chamber when the boiler is shut down. It serves to replenish the loss by evaporation from the constant head chamber in precisely the same way that it replenishes the loss on sudden pressure drop. Thus, the indicator remains operative during long periods of shutdown and does not require special attention when the boiler is restored to service. The capacity of the auxiliary head chamber should be adequate to replenish loss by evaporation during most normal periods of boiler shutdown.

In the case of systems where the vapor-liquid thermal equilibrium is not maintained or where condensation does not continuously provide for overflow, the chamber can be used as a replenishment reservoir, thus permitting constant maintenance of the reference level in place of mechanical overflow mains which might be provided by pumps, for example.

Where this use is important, normally open valve 50 is useful in the system to cut off connection from the bottom of the auxiliary head chamber and the equalizer connection to the constant head chamber during periods when priming valve 47 is to be opened to permit periodic refilling of the auxiliary head chamber 41 while it is sealed off from the constant head chamber.

Experiments have been conducted with the device of the invention when pressure drop in the boiler was deliberately created. The first manifestation was simmering of the water surface in the constant head chamber as soon as the pressure drops, increasing to rapid boiling. As the experiment continued, rapid boiling in the constant head chamber continued but the auxiliary head chamber remained quiet. The water in the constant head chamber lowered to a position opposite the level of the inlet opening 43 from the auxiliary head chamber and then the auxiliary head chamber began feeding water into the constant head chamber maintaining the water of the constant head chamber level with the top of the connection 43. The indicator, which was at mid-scale at the start of the experiment, continued to indicate the need for water in the boiler (red zone). After about twenty-five minutes, when full pressure was restored, the constant head chamber and the auxiliary head chamber both refilled and operation continued at a normal manner.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a liquid level indicator for indication of the level of the liquid in a boiler or the like, a constant head column having a top connection adapted to communicate with steam in the boiler, having a bottom connection adapted to communicate with water in the boiler and having an overflow connection between the top and the bottom connection and adapted to determine the level of liquid in the constant head chamber, an indicator connected at one side to the bottom connection of the constant head chamber and connected at the other side to the overflow connection of the constant head chamber, and an auxiliary head chamber extending above the level of the overflow connection in the constant head chamber, and having a bottom connection to the constant head chamber at a point beneath the level of the overflow connection, said auxiliary head chamber being maintained at a temperature substantially lower than the temperature in the constant head chamber.

2. An indicator of claim 1, wherein the said auxiliary head chamber has a volume of at least twice the volume of the liquid in the constant head chamber.

3. A liquid level indicator of claim 1, in combination with an equalizer tube extending from the top of the auxiliary head chamber to the liquid in the constant head chamber at a level below the overflow connection.

4. A liquid level indicator of claim 3, in combination with a vent valve at the top of the auxiliary head chamber.

No references cited.